United States Patent
Huang

(10) Patent No.: US 9,898,057 B2
(45) Date of Patent: Feb. 20, 2018

(54) FAN FIXING DEVICE

(71) Applicants: NANNING FUGUI PRECISION INDUSTRIAL CO., LTD., Nanning (CN); HON HAI PRECISION INDUSTRY CO., LTD., New Taipei (TW)

(72) Inventor: Ying-Jui Huang, New Taipei (TW)

(73) Assignees: NANNING FUGUI PRECISION INDUSTRIAL CO., LTD., Nanning (CN); HON HAI PRECISION INDUSTRY CO., LTD., New Taipei (TW)

(*) Notice: Subject to any disclaimer, the term of this patent is extended or adjusted under 35 U.S.C. 154(b) by 0 days.

(21) Appl. No.: 15/141,851

(22) Filed: Apr. 29, 2016

(65) Prior Publication Data

US 2017/0185114 A1    Jun. 29, 2017

(30) Foreign Application Priority Data

Dec. 28, 2015 (TW) .................................. 104144025

(51) Int. Cl.
*A47B 96/06* (2006.01)
*G06F 1/20* (2006.01)
*F16B 2/04* (2006.01)

(52) U.S. Cl.
CPC .................. *G06F 1/20* (2013.01); *F16B 2/04* (2013.01); *A47B 96/06* (2013.01)

(58) Field of Classification Search
CPC .... G06F 1/20; F16B 2/04; G21B 9/00; A47G 29/00; A47B 96/06; A47K 1/00; E04G 3/00; E04G 5/06; F21V 21/00; F21V 35/00

USPC ........ 248/27.1, 27.3, 220.21, 221.11, 222.11; 361/679.57, 679.37, 679.39
See application file for complete search history.

(56) References Cited

U.S. PATENT DOCUMENTS

| | | | | |
|---|---|---|---|---|
| 2,609,268 A | * | 9/1952 | Nye | H01M 2/1083 100/213 |
| 4,947,661 A | * | 8/1990 | Yoshida | B60K 37/04 248/27.1 |
| 4,954,928 A | * | 9/1990 | Jullien | H05K 5/0286 361/679.31 |
| 5,152,496 A | * | 10/1992 | Kobayashi | B60R 11/02 248/27.1 |
| 5,557,499 A | * | 9/1996 | Reiter | G06F 1/184 312/223.2 |
| 5,586,003 A | * | 12/1996 | Schmitt | G06F 1/184 312/332.1 |
| 5,765,933 A | * | 6/1998 | Paul | H01R 13/6335 312/223.1 |
| 5,791,753 A | * | 8/1998 | Paquin | H05K 7/1411 312/223.1 |

(Continued)

*Primary Examiner* — Nkeisha Smith
(74) *Attorney, Agent, or Firm* — ScienBiziP, P.C.

(57) ABSTRACT

A device for fixing a heat dissipation fan in a computer includes a cage, a handle, and a movable portion. The handle is rotatably fixed on the cage, the handle has a pushing pole and holes are defined at each distal end. The movable portion is movably and elastically connected to the cage. The movable portion includes a plate with opposite ends, a sloping sheet connected with the plate at one end, and a protrusion extending from the plate at the same end as the sheet.

19 Claims, 10 Drawing Sheets

(56) References Cited

U.S. PATENT DOCUMENTS

| | | | | |
|---|---|---|---|---|
| 6,134,115 A * | 10/2000 | Sim | ............... | G06F 1/184 |
| | | | | 292/336.3 |
| 6,272,005 B1 * | 8/2001 | Jensen | ............... | G06F 1/184 |
| | | | | 312/223.1 |
| 6,374,460 B1 * | 4/2002 | Edevold | ............... | A45C 13/26 |
| | | | | 16/422 |
| 8,256,737 B2 * | 9/2012 | Stango | ............... | G05G 5/005 |
| | | | | 248/274.1 |
| 8,451,605 B2 * | 5/2013 | Chen | ............... | G06F 1/20 |
| | | | | 361/679.48 |
| 9,210,821 B2 * | 12/2015 | Lin | ............... | H05K 5/0221 |
| 9,307,673 B2 * | 4/2016 | Chu | ............... | H05K 7/20172 |

* cited by examiner

FAN FIXING DEVICE

CROSS-REFERENCE TO RELATED APPLICATIONS

This application claims priority to Taiwanese patent application no. 104144025, filed on Dec. 28, 2015, the contents of which are incorporated by reference herein.

FIELD

The subject matter generally relates to computer cooling, and particularly to a fixing device for fixing a heat dissipating fan in the computer.

BACKGROUND

A heat dissipation fan is typically assembled in the computer to dissipate heat generated from electric elements. A heat dissipation fan should be easy to fit into and disassemble from a computer, and a user or technician should be able to carry out such operations without having to take the whole computer apart.

BRIEF DESCRIPTION OF THE DRAWINGS

Implementations of the present technology will now be described, by way of example only, with reference to the attached figures.

DETAILED DESCRIPTION

Figure 1:
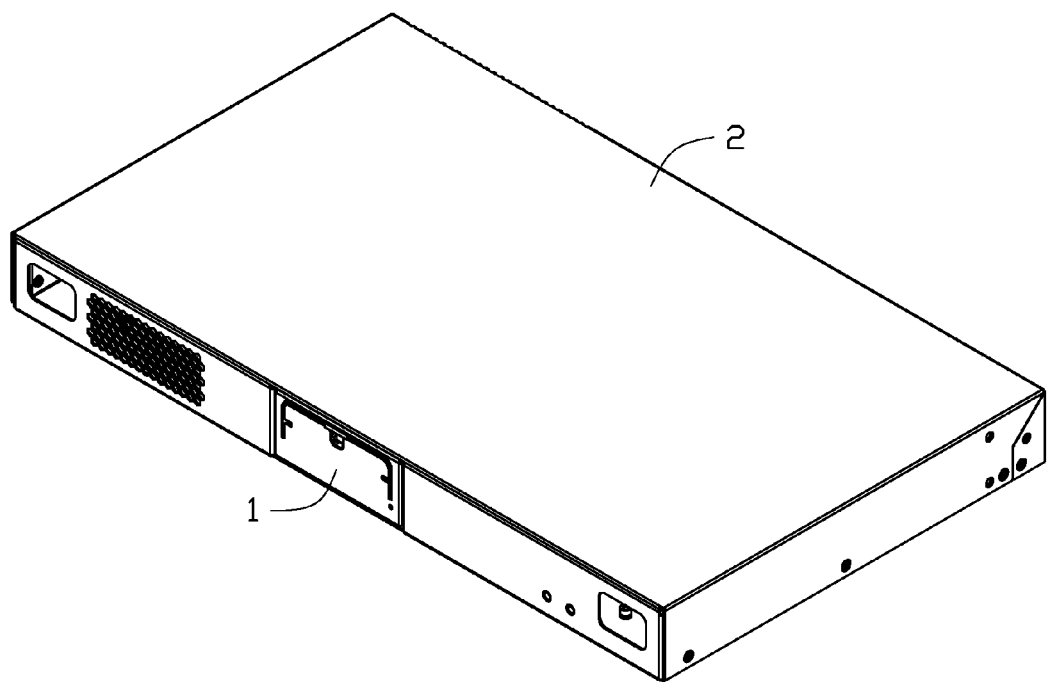
FIG. 1 is an isometric view of a fan fixing device assembled in a casing of a computer in accordance with an exemplary embodiment of the present disclosure.

It will be appreciated that for simplicity and clarity of illustration, where appropriate, reference numerals have been repeated among the different figures to indicate corresponding or analogous elements. In addition, numerous specific details are set fourth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series and the like.

The present disclosure is described in relation to a fan fixing device.

Figure 2:
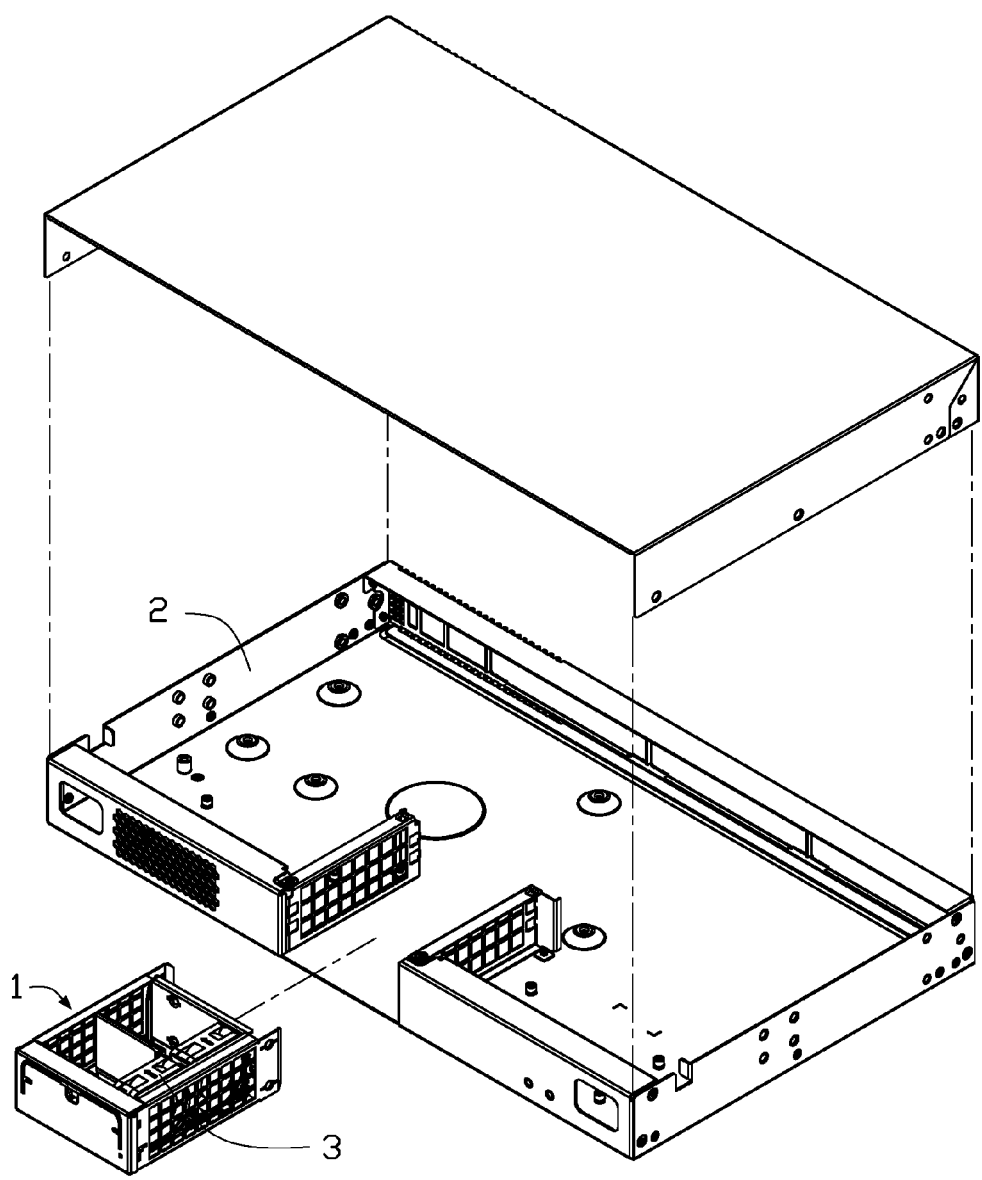
FIG. 2 is an isometric view of the fan fixing device of FIG. 1 separated from the casing.

FIGS. 1 and 2 illustrate a fan fixing device 1 configured for assembling a heat dissipation fan 3 in a casing 2 of a computer.

Figure 3:
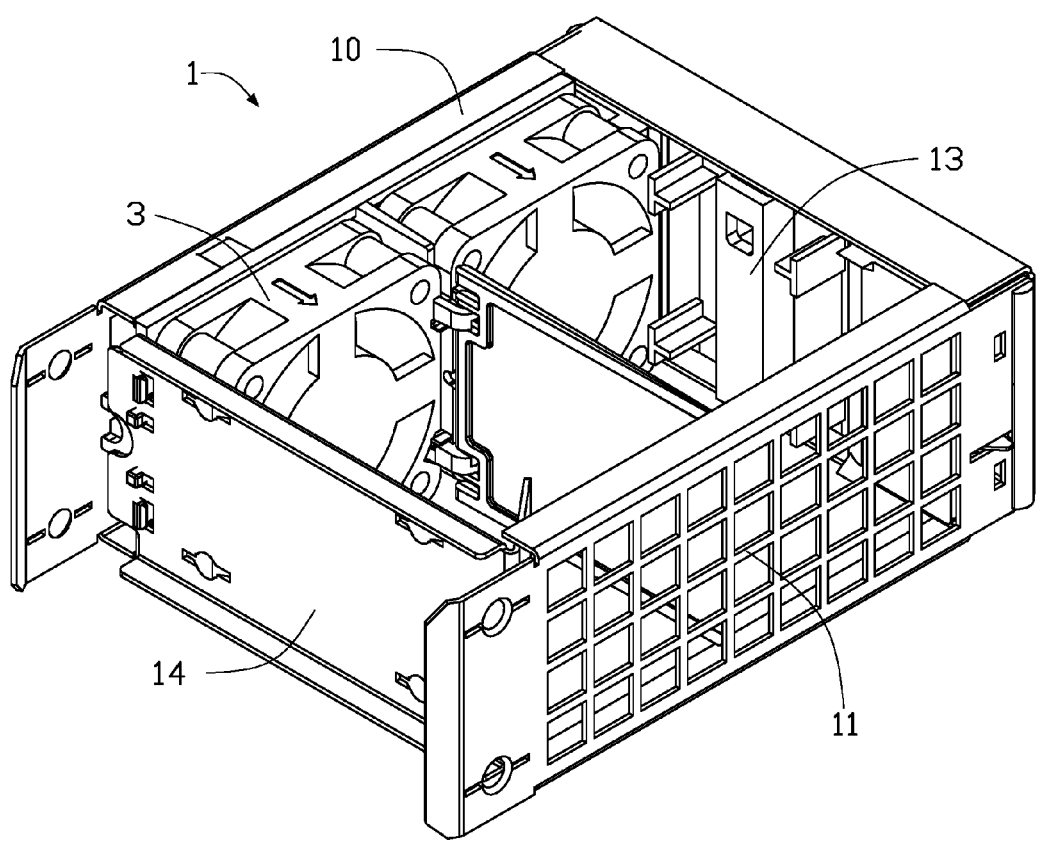
FIG. 3 is an isometric view of the fan fixing device in FIG. 1, the casing being omitted.
Figure 4:
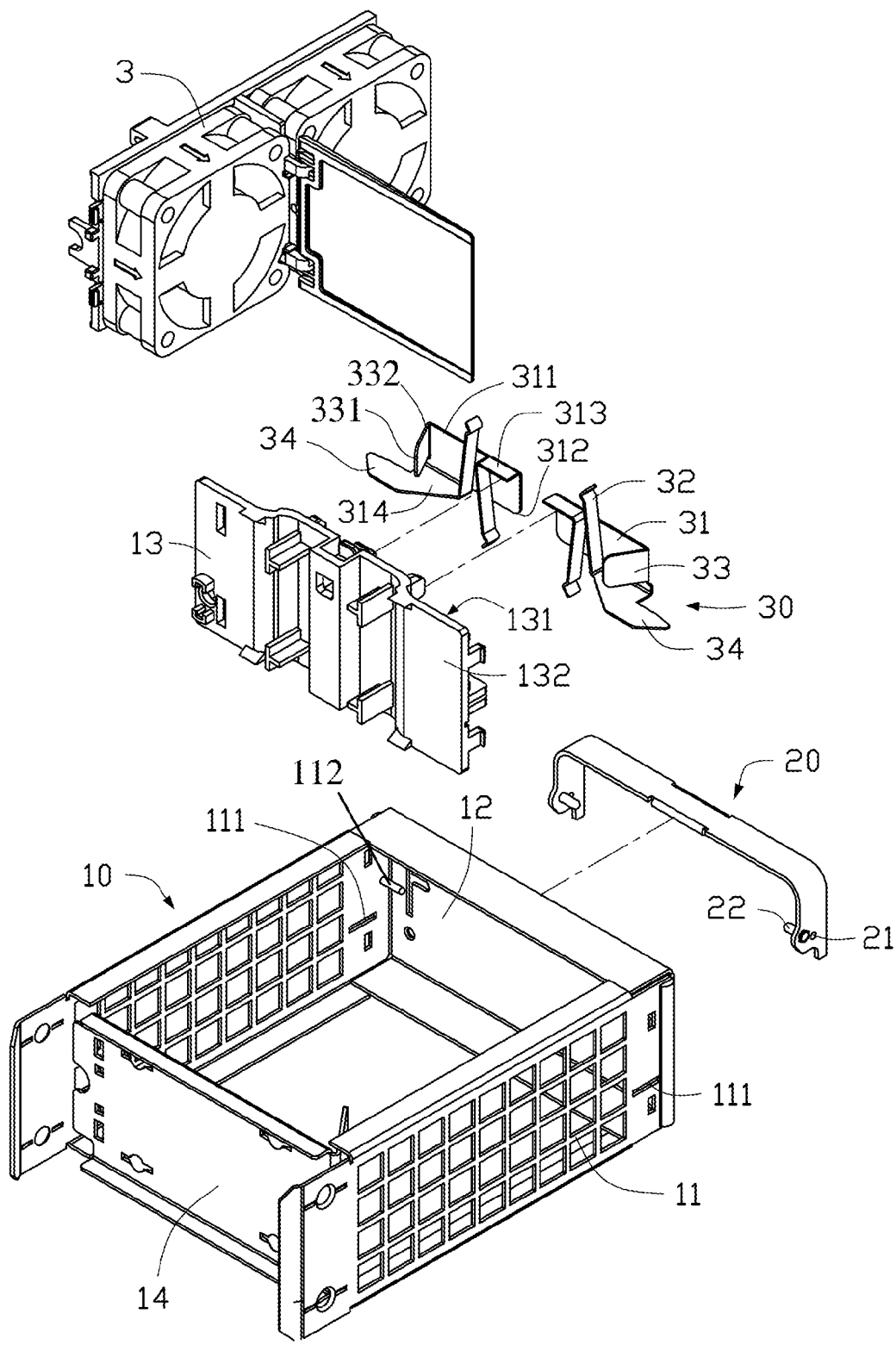
FIG. 4 is an exploded, isometric view of the fan fixing device in FIG. 3.
Figure 5:
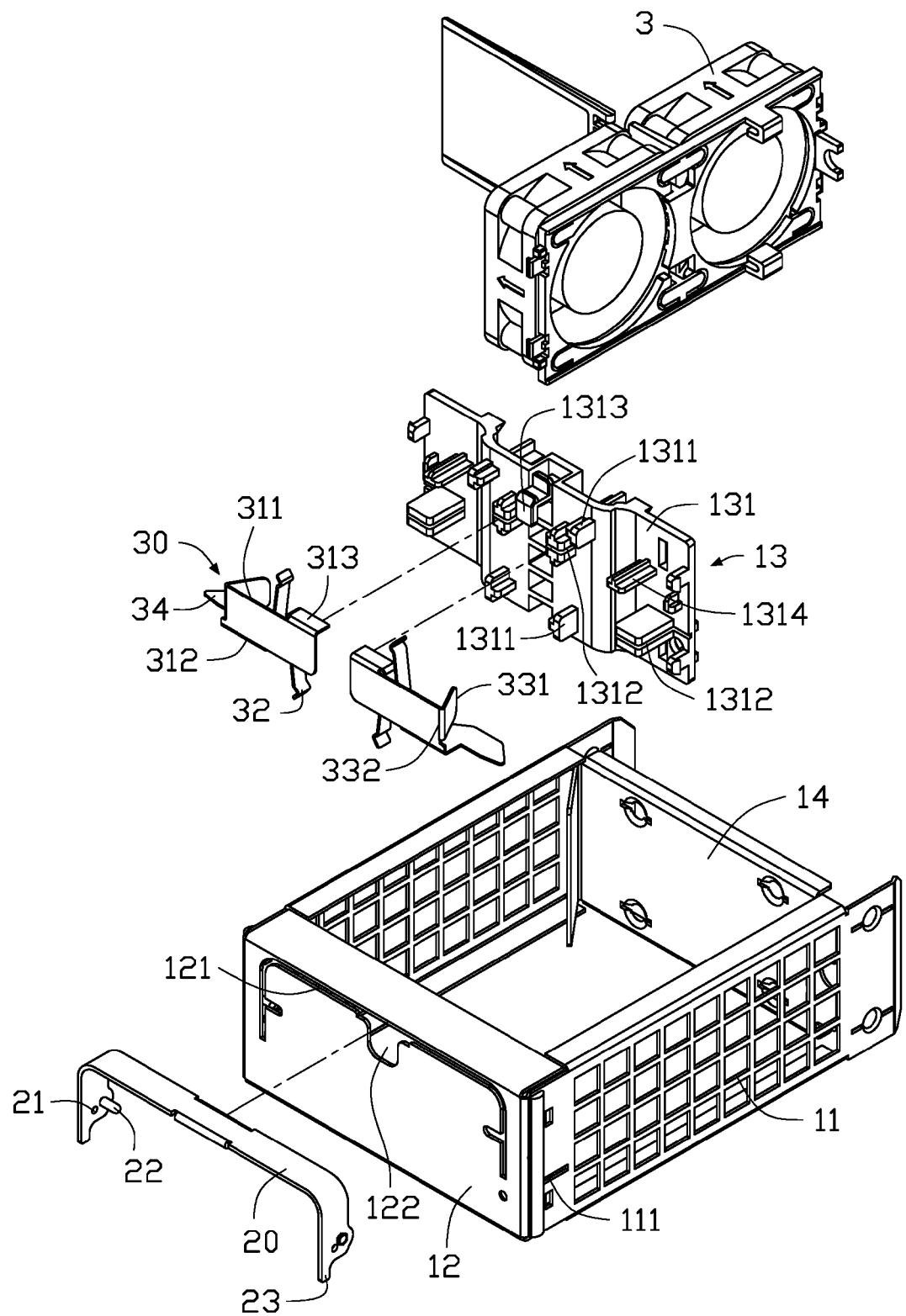
FIG. 5 is an enlarged isometric view of the fan fixing device in FIG. 3, from another angle.

FIGS. 3 to 5 show that the fan fixing device 1 includes a cage 10, a handle 20 fixed on the cage 10, and a movable portion 30 fixed in the cage 10. The fixing device 1 is received in the casing 2. The heat dissipation fan 3 is detachably assembled in the fixing device 1.

The movable portion 30 is substantially rectangular. The movable portion 30 includes a plate 31, two elastic arms 32, a sheet 33, and a protrusion 34.

The plate 31 is substantially rectangular. The plate 31 includes two opposite ends. An elastic force and elastic restoring force direction of each elastic arm 32 is in the same direction as the direction of movement of the movable portion 30. In the illustrated embodiment, the elastic direction of the elastic arm 32 is horizontal, and the direction of movement of the movable portion 30 is also horizontal. The protrusion 34 extends horizontally from an end of the plate 31. The protrusion 34 and the sheet 33 are located at the same end of the plate 31.

In the illustrated embodiment, there are two elastic arms 32. The elastic arms 32 each are bent from opposite sides of the plate 31 perpendicularly and are bent oppositely to a predetermined angle. Specifically, the plate 31 includes an upper side 311 and a lower side 312. The upper side 311 forms an upper piece 313 perpendicular to the plate 31. One of the elastic arms 32 is formed by the bending of the upper piece 313 towards the lower side 312. In other words, one of the elastic arms 32 is located at an end of the upper piece 313 and extends towards the lower side 312. The lower side 312 forms a lower piece 314 perpendicular to the plate 31 away from the upper piece 313. The upper piece 313 is parallel to the lower piece 314. The other one of the elastic arms 32 is formed by the bending of the lower piece 314 towards the upper piece 313. In other words, the other one of the elastic arms 32 is located at an end of the lower piece 314 and extends towards the upper side 311. The upper piece 313 and the lower piece 314 are located on the same surface of the plate.

One elastic arm 32 is located at the upper side 311 and the other elastic arm 32 at the lower side 312. Thus, a sum of the elastic force of the two elastic arms 32 is horizontal. The protrusion 34 is formed by extending the lower piece 314 away from the plate 31. The sheet 33 slopes in relation to the plate 31 and connected with the plate 31 at one end. The sheet 33 extends along a direction substantially opposite to the protrusion 34 and is at the same end of the plate 31 as the protrusion 34. The sheet 33 includes a free end 331 and a tapering end 332. The sheet 33 is formed by bending the plate 31 back to a predetermined angle, with the free end 331 formed at distal end thereof and the tapering end 332 being at the location of the bend. The sheet 33 is connected with the plate 31 at the tapering end 332.

The handle 20 has a rotary connection with the cage 10. The handle 20 is substantially U shaped. Each distal end of the handle 20 forms a hole 21, a pushing pole 22, and a blocking pole 23. The handle 20 can rotate axially within the two holes 21, while each pushing pole 22 can rotate with respect to the hole 21. The pushing pole 22 extends perpendicularly to the distal end of the handle 20. In other words, the pushing pole 22 is perpendicular to the plane on which the U shaped handle 20 is located. The blocking pole 23 extends from the distal end of the handle 20 along the same direction of the distal end of the handle 20. The blocking pole 23 is perpendicular to the pushing pole 22.

The handle 20 can be rotated from a horizontal state to a vertical state. When the handle 20 is at the vertical state, the pushing pole 22 is spaced from the movable portion 30, and the pushing pole 22 is located adjacent to the free end 331 of the sheet 33. When the handle 20 begins to be turned, the pushing pole 22 rotates with respect to the hole 21 and gets closer to the movable portion 30 until the pushing pole 22 contacts with the sheet 33 of the movable portion 30. As the handle 20 keeps turning, the pushing pole 20 slides along the sheet 33, from the free end 331 to the tapering end 332 of the sheet 33, thereby moving the movable portion 33 and increasing the compressed state of the elastic arms 32.

The cage 10 is substantially rectangular. The cage 10 includes two side walls 11 on the left and right sides thereof and three walls connecting the two side walls 11. The three walls are an outer wall 12 adjacent to outer side of the casing 2, an inner wall 13 facing the outer wall 12, and a back wall 14 located at an opposite side from the outer wall 12 in the cage 10.

The two side walls 11 each define an opening 111, the openings 111 facing each other. The two side walls 11 connect to both the outer wall 12 and the inner wall 13. The protrusion 34 of the movable portion 30 protrudes from the cage 10 via the opening 111 to secure the cage 10 onto the casing 2. The inner wall 13 is adjacent to the outer wall 12. The heat dissipation fan 3 is assembled between the inner wall 13 and the back wall 14.

The side walls 11 each form a column 112, the columns 112 facing each other. The two columns 112 are located adjacent to the outer wall 12 and extend towards each other. The two columns 112 penetrate through the hole 21 to rotatably assemble the handle 20 to the cage 10.

The outer wall 12 defines a receiving groove 121 and a cavity 122. The receiving groove 121 is configured for receiving the handle 20 therein. When the handle 20 is not needed, it can be turned from the horizontal state to the vertical state and be received in the receiving groove 121. A shape of the receiving groove 121 corresponds to that of the handle 20. In the illustrated embodiment, the receiving groove 121 is U shaped and inverted. The receiving groove 121 is adjacent to a peripheral side of the outer wall 12. The cavity 122 is defined in a middle portion of the outer wall 12 and communicates with the receiving groove 121. In the illustrated embodiment, the cavity 122 is substantially rectangular and chamfered.

Figure 6:
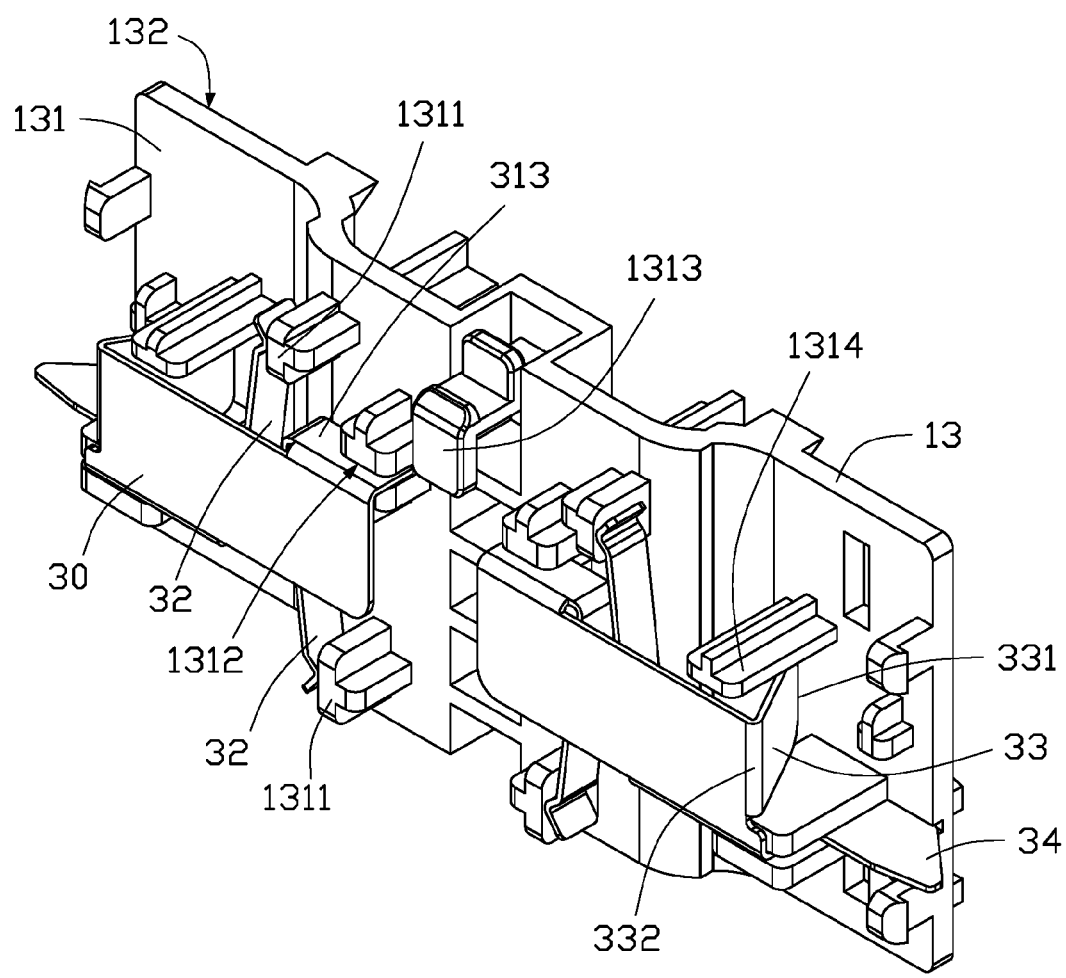
FIG. 6 is an isometric, assembled view of a movable portion and an inner wall of the fan fixing device in FIG. 4.
Figure 7:
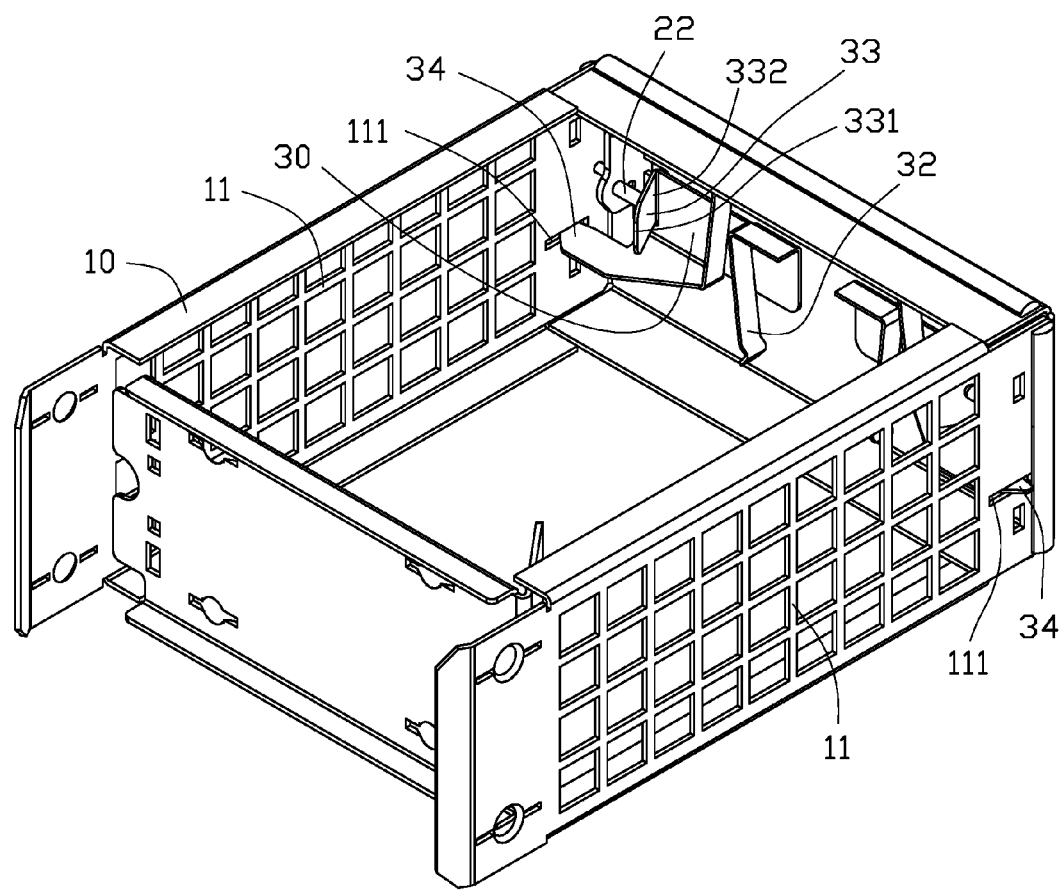
FIG. 7 is an isometric, assembled view of an outer wall and side walls of the fan fixing device in FIG. 4, wherein the cage is locked to the casing.
Figure 8:
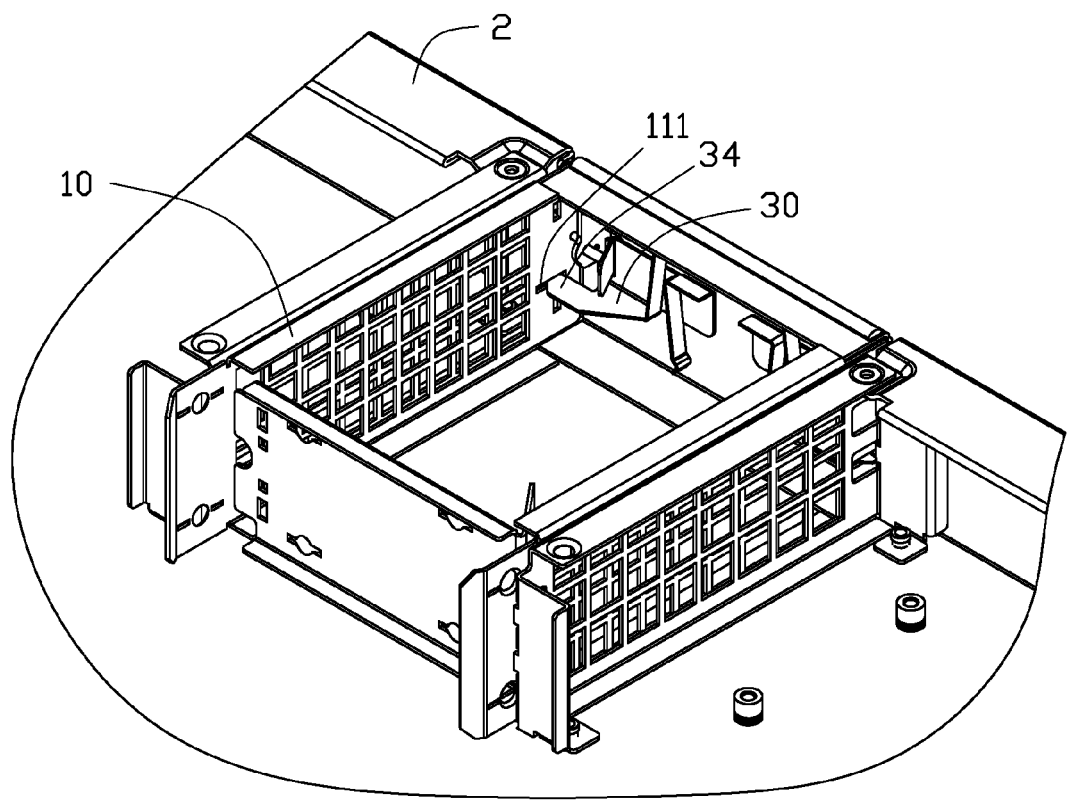
FIG. 8 is an isometric, assembled view of the fan fixing device and the casing in FIG. 3, wherein the cage is locked to the casing.
Figure 9:
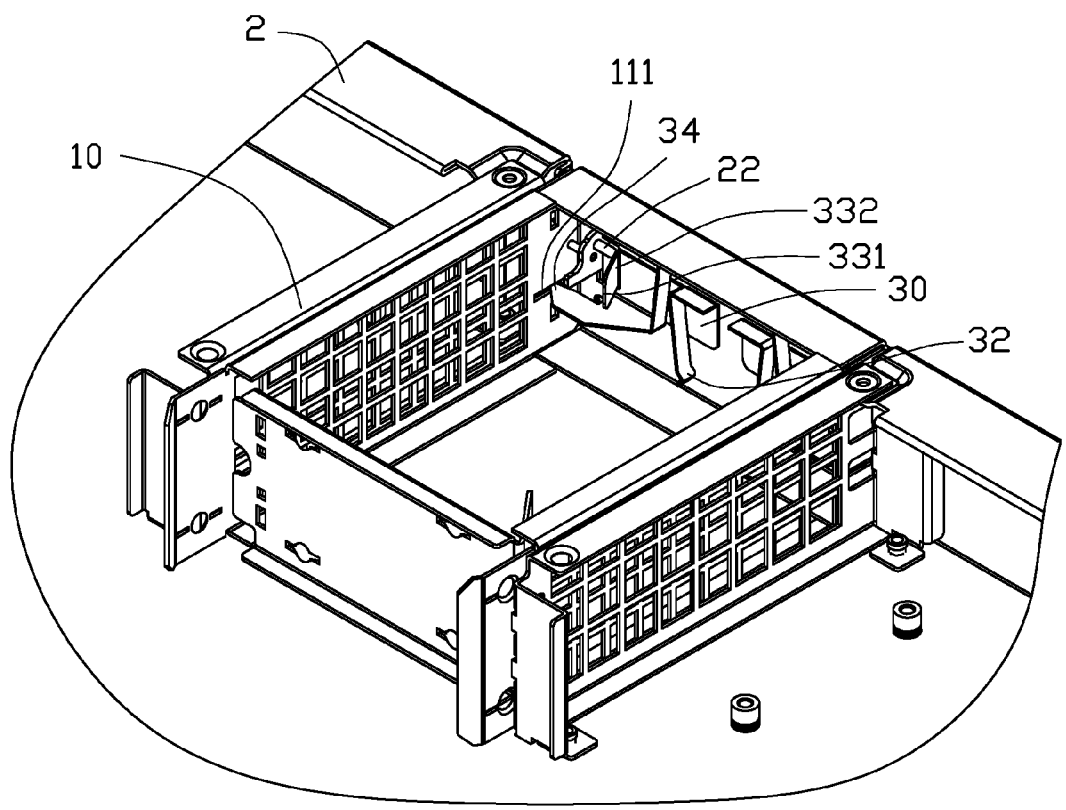
FIG. 9 is an isometric, assembled view of the fan fixing device and the casing in FIG. 3, wherein the cage is unlocked.
Figure 10:
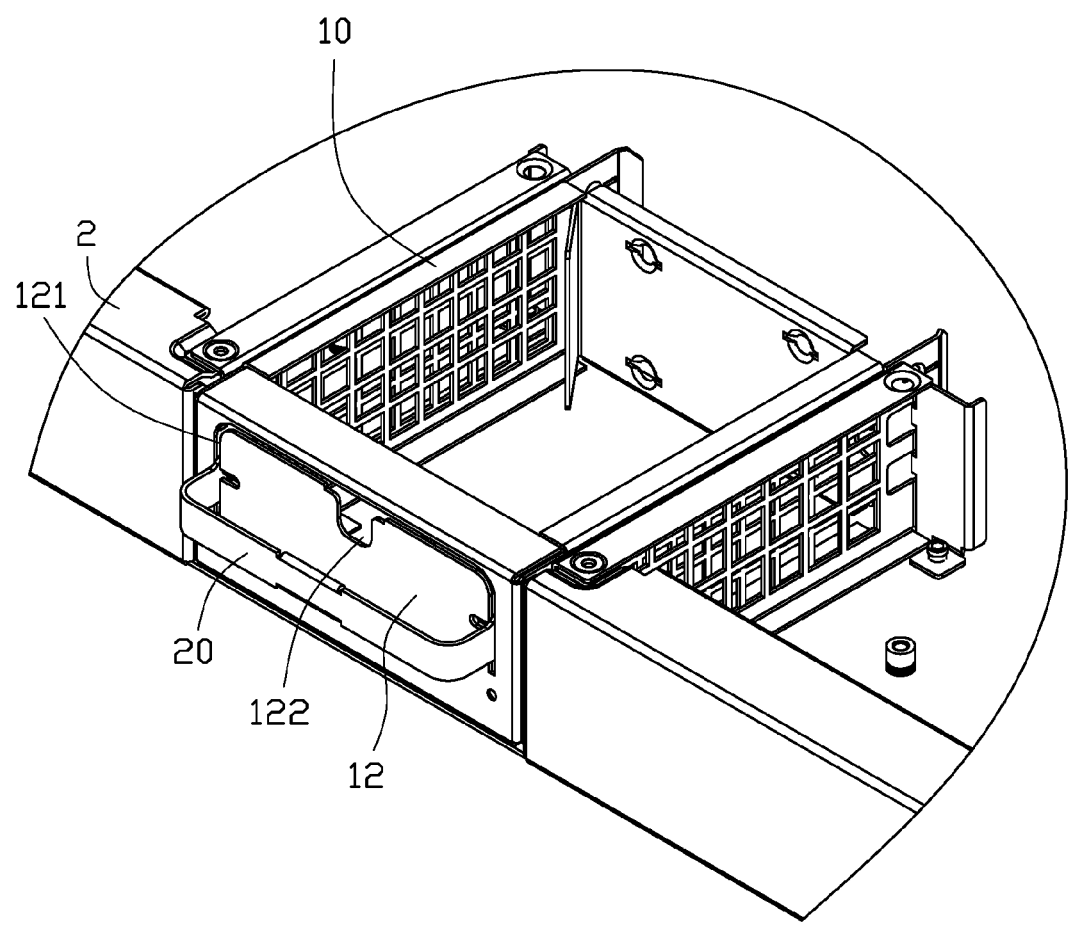
FIG. 10 is an isometric, assembled view of the outer wall and the handle of the fan fixing device in FIG. 3, wherein the cage is unlocked.

Referring to FIG. 6, the inner wall 13 includes two opposite surfaces, a first surface 131 facing the outer wall 12 and a second surface 132 facing the back wall 14. The movable portion 30 is fixed between the outer wall 12 and the inner wall 13 of the cage 10. Specifically, the movable portion 30 is fixed on the first surface 131 of the inner surface 13. The first surface 131 defines a plurality of slots and barriers to receive the movable portion 30 and guide the movement of the movable portion 30.

The inner wall 13 is symmetrical about a central vertical axis, with one movable portion 30 fixed on each side of the axis. Taking one side of the inner wall 13 as an example, two slots 1312 are defined on the side of the inner wall 13, and two barriers 1311 are formed on the same side. The two barriers 1311 abut against the two elastic arms 32. The two barriers 1311 are located so as to oppose the elastic restoring force of the two elastic arms 32. In the illustrated embodiment, each barrier 1311 contacts an elastic arm 32 away from the side wall 11 and abuts against the elastic arm 32 in a vertical plane. The two slots 1312 receive the upper piece 313 and the lower piece 314 of the movable portion 30. Each of the two slots 1312 is defined between two spaced vertical protrusions.

The first surface 131 of the inner wall 13 forms a block 1314 corresponding to the blocking pole 23 of the handle 20. When the handle 20 is moved from the vertical state to the horizontal state, the blocking pole 23 is clamped into the block 1314 to limit the handle horizontally.

Referring to FIGS. 6 to 10, the movable portion 30 can slide along and return along the vertical slot 1312 in the horizontal direction under the urging of the elastic arms 32.

When the handle 20 is moved from the vertical state to a horizontal state, the pushing pole 22 gets closer to the movable portion 30 until contact is made with the plate 31, and the pole 22 slides from the free end 331 to the tapering end 332 to compress the elastic arm 32, thereby moving the plate 31 back inside the casing 2 and clamping the cage 10 flush with the casing 2. The movable portion 30 moves towards the central axis of the inner wall 13. The movable portion 30 is thereby unlocked and the cage 10 can be pulled out of the casing 2.

When the handle 20 is moved from the horizontal state to the vertical state, the handle 20 rotates with respect to the hole 21, and the pushing pole 22 rotates with respect to the hole 21. The pushing pole 22 moves from the tapering end 332 to the free end 331. The elastic arms 32 recover from being compressed. The movable portion 30 moves away from the central axis of the inner wall 13. The protrusion 34 protrudes outside of the cage 10 through the opening 111 of the side wall 11 to clamp the casing 2. The movable portion 30 is thereby locked and the cage 10 can be locked to the casing 2.

When the handle 20 is moved from the horizontal state to the vertical state, if no force is applied to the handle 20, the handle 20 will be snapped from the vertical state to the horizontal state under the urging of the elastic arms 32. The cage 10 will be snapped into the inner side of the casing 2 and the protrusion 34 will be clamped on the casing 2 to lock the cage 10.

Referring again to FIG. 5 and FIG. 6, the inner wall 13 further forms a pressing portion 1313. The pressing portion 1313 is formed on the central axis of the first surface 131. The pressing portion 1313 has a shape corresponding to the cavity 122 on the outer wall 12. The pressing portion 1313 is configured for clamping the handle 20. The pressing portion 1313 is bent downwards to form a hook. When the handle 20 is received in the receiving hole 121 of the outer wall 12, the handle 20 can be clamped by the pressing portion 1313, to secure the handle 20. When the handle 20 needs to be pushed out, the pressing portion 1313 can be pushed upwards to separate the handle 20 from the pressing portion 1313, then the handle 20 can be turned from the vertical state to the horizontal state.

It is to be further understood that even though numerous characteristics and advantages have been set forth in the foregoing description of exemplary embodiments, together with details of the structures and functions of the exemplary embodiments, the disclosure is illustrative only; and that changes may be made in detail, according in matters of shape, size, and arrangement of parts within the principles of the disclosure to the full extent indicated by the broad general meaning of the terms in which the appended claims are expressed.

The exemplary embodiments shown and described above are only examples. Many details are often found in the art such as other features of a fan fixing device, therefore many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A fan fixing device configured for assembling a heat dissipation fan in a computer, the fixing device comprising:
   a cage;
   a handle rotatably fixed on the cage, the handle having a pushing pole and defining two holes each at one of two distal ends of the handle; and
   a movable portion movably and elastically connected to the cage, the movable portion comprising:
      a plate having two opposite ends;
      a sheet, the sheet sloping in relation to the plate and connected with the plate at one end of the plate; and
      a protrusion extending from the one end of the plate as the sheet;
      wherein when the handle is at a vertical state, the pushing pole is spaced from the movable portion; and
   wherein when the handle is moved from the vertical state to a horizontal state, the pushing pole pushes the movable portion until the pushing pole contacts the sheet of the movable portion, and the pushing pole slides along the sheet to move the movable portion, thereby moving the plate back inside the cage and clamping the cage flush with the casing.

2. The fan fixing device of claim 1, wherein the protrusion extends horizontally from an end of the plate.

3. The fan fixing device of claim 1, wherein the sheet extends along a direction opposite to the protrusion, the sheet is formed by bending the plate back to an angle and has a bend, with a free end formed at distal end thereof and a tapering end being located at the bend.

4. The fan fixing device of claim 1, wherein the sheet comprises a free end and a tapering end, the sheet is connected with the plate at the tapering end, when the cage is locked to the casing, the pushing pole of the handle is located adjacent to the free end of the sheet, when the handle keeps turning, the pushing pole slides from the free end to the tapering end of the sheet.

5. The fan fixing device of claim 1, wherein the movable portion further comprises two elastic arms, an elastic force and elastic restoring force direction of each elastic arm is in a same direction as a direction of movement of the movable portion.

6. The fan fixing device of claim 5, wherein the plate further comprises an upper side and a lower side opposite to the upper side.

7. The fan fixing device of claim 6, wherein the upper side forms an upper piece perpendicular to the plate, one of the elastic arms is located at an end of the upper piece and extends towards the lower side.

8. The fan fixing device of claim 7, wherein the lower side forms a lower piece perpendicular to the plate and away from the upper piece, the upper piece is parallel to the lower piece, and another one of the elastic arms is located at an end of the lower piece and extends towards the upper side.

9. The fan fixing device of claim 6, wherein the cage comprises an outer wall adjacent to outer side of the casing and an inner wall facing the outer wall, and the movable portion is located between the outer wall and the inner wall.

10. The fan fixing device of claim 9, wherein the movable portion is assembled on the inner wall, the inner wall defines a plurality of slots and barriers to receive the movable portion and guide the movement of the movable portion.

11. The fan fixing device of claim 10, wherein two slots are defined on the side of the inner wall, the two slots receive the upper piece and the lower piece of the movable portion respectively.

12. The fan fixing device of claim 10, wherein two barriers are formed on the side of the inner wall as the two slots, the two barriers abut against the two elastic arms, the two barriers are located in the direction of the elastic restoring force of the two elastic arms.

13. The fan fixing device of claim 9, wherein the inner wall further forms a pressing portion, the outer wall defines a cavity, the pressing portion has a shape corresponding to the cavity on the outer wall, and the pressing portion is configured for clamping the handle.

14. The fan fixing device of claim 13, wherein the outer wall further defines a receiving groove, the receiving groove is configured for receiving the handle therein.

15. The fan fixing device of claim 14, wherein the handle is U shaped, and the receiving groove is U shaped and inverted, when the cage is locked to the casing, the handle is received in the receiving groove at the vertical state.

16. The fan fixing device of claim 9, wherein the cage further comprises two side walls, the side walls connect to both the outer wall and the inner wall, the side walls each define an opening facing each other, the protrusion of the plate is protruded out of the casing from the opening.

17. The fan fixing device of claim 16, wherein the side walls each form a column, the two columns are located adjacent to the outer wall and extend towards each other, the two columns penetrate through the hole of the handle to rotatably assemble the handle to the cage.

18. The fan fixing device of claim 1, wherein the handle forms a blocking pole at each distal end, the pushing pole extends perpendicular to the distal end of the handle, the blocking pole being perpendicular to the pushing pole.

19. The fan fixing device of claim 18, wherein the blocking pole extends from the distal end of the handle, when the handle is at the vertical state, the pushing pole is spaced from the movable portion; when the handle begins to be turned, the pushing pole rotates with respect to the hole of the handle and gets closer to the movable portion until the pushing pole contacts with the plate of the movable portion.

* * * * *